(12) United States Patent
Mushiga et al.

(10) Patent No.: US 8,252,456 B2
(45) Date of Patent: Aug. 28, 2012

(54) BATTERY OUTER LABEL AND BATTERY PROVIDED WITH THE SAME

(75) Inventors: Takashi Mushiga, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/527,136

(22) PCT Filed: Dec. 9, 2008

(86) PCT No.: PCT/JP2008/003669
§ 371 (c)(1),
(2), (4) Date: Aug. 13, 2009

(87) PCT Pub. No.: WO2010/013299
PCT Pub. Date: Feb. 4, 2010

(65) Prior Publication Data
US 2011/0236746 A1    Sep. 29, 2011

(30) Foreign Application Priority Data
Aug. 1, 2008  (JP) .................................. 2008-199345

(51) Int. Cl.
  *H01M 2/02*  (2006.01)
  *B32B 7/12*  (2006.01)
(52) U.S. Cl. ........ 429/167; 429/163; 428/343; 428/344; 428/347; 428/354
(58) Field of Classification Search .................. 429/163, 429/167; 428/343, 344, 347, 354
See application file for complete search history.

(56) References Cited

U.S. PATENT DOCUMENTS

| | | | |
|---|---|---|---|
| 5,725,966 A * | 3/1998 | Abe et al. ....................... | 429/167 |
| 2003/0049522 A1* | 3/2003 | Doomernik ..................... | 429/93 |
| 2005/0028923 A1 | 2/2005 | Francois | |
| 2006/0251891 A1* | 11/2006 | Aarnio .......................... | 428/343 |

FOREIGN PATENT DOCUMENTS

| | | | |
|---|---|---|---|
| JP | 62-177864 | | 8/1987 |
| JP | 05-266865 | | 10/1993 |
| JP | 09-237614 | | 9/1997 |
| JP | 09281894 | A * | 10/1997 |
| JP | 09-306440 | | 11/1997 |
| JP | 2001-332226 | | 11/2001 |
| JP | 2002-208381 | | 7/2002 |
| JP | 2003178727 | A * | 6/2003 |
| JP | 2004-216790 | | 8/2004 |
| JP | 2006-185726 | | 7/2006 |

OTHER PUBLICATIONS

Derwent Abstract for Hayashi et al., JP 09-281894 A.*
Machine translation for Hayashi et al., JP 09-281894 A.*
European Search Report issued in European Patent Application No. 08876656.3-2119, mailed Jul. 14, 2010.

* cited by examiner

*Primary Examiner* — Barbara Gilliam
*Assistant Examiner* — Edu E Enin-Okut
(74) *Attorney, Agent, or Firm* — McDermott Will & Emery LLP

(57) ABSTRACT

A battery outer label 1 including a heat-shrinkable resin film such as of polyethylene terephthalate as a base material 2, a printing layer 5 and a protective layer 6 formed on a front surface of the base material 2, and a vapor-deposited metal layer 3 and an adhesive layer 4 formed on a back surface of the base material 2, wherein the battery outer label 1 has a water vapor permeability in the range of 14 to 30 $g/m^2 \cdot 24$ h.

10 Claims, 1 Drawing Sheet

BATTERY OUTER LABEL AND BATTERY PROVIDED WITH THE SAME

RELATED APPLICATIONS

This application is the U.S. National Phase under 35 U.S.C. §371 of International Application No. PCT/JP2008/003669, filed on Dec. 9, 2008, which in turn claims the benefit of Japanese Application No. 2008-199345, filed on Aug. 1, 2008, the disclosures of which Applications are incorporated by reference herein.

TECHNICAL FIELD

The present invention relates to battery outer labels and batteries including the same.

BACKGROUND ART

In general, a battery outer label (hereinafter simply referred to as "an outer label") includes a heat-shrinkable resin film as a base material, a printing layer formed on a front surface of the resin film (a surface visible after the assembly) for providing thereon suitable patterns, letters, colors, etc., and a protective layer made of wear-resistant varnish or transparent lacquer for protecting the printing layer.

On a back surface of the heat-shrinkable resin film (a surface in contact with the battery), a vapor-deposited metal layer, such as of aluminum, is formed to give a metallic sheen and high luminance to the printing layer, and an adhesive layer is formed for adhesion between the label and the battery. Polyvinyl chloride is used as a material for the heat-shrinkable resin film in most cases, and polyethylene, polystyrene, polypropylene, polyethylene terephthalate, etc., are used in some cases.

The outer label is wrapped around an outer circumferential surface of a battery case (mainly made of a nickel-plated steel sheet) sealed with battery components contained therein, and is adhered thereto by heat-shrinking the entire outer label by hot air.

As to the batteries provided with the outer label including the vapor-deposited metal layer, various studies on the structure of the outer label have been made for the purpose of retaining the appearance of the battery during storage at high temperature and high humidity. For example, Patent Document 1 describes a technique of providing a heat-resistant, electrically insulating layer between the vapor-deposited metal layer and the adhesive layer of the outer label so as to avoid defects, i.e., leaching of the vapor-deposited metal layer and loss of the metallic sheen during storage at high temperature and high humidity.

Patent Document 2 describes a technique of providing a hydrophobic coating at the end faces of the outer label so as to suppress the leaching of the vapor-deposited metal layer.

Further, Patent Documents 2 and 3 also describe a technique of suppressing the leaching of the vapor-deposited metal layer by setting a potential difference between the vapor-deposited metal layer and the attachment surface (the battery surface) to be electrochemically equal or small so as to prevent or delay the formation of local cell.

[Patent Document 1] Published Unexamined Japanese Patent Publication No. H09-237614
[Patent Document 2] Published Unexamined Japanese Patent Publication No. 2002-208381
[Patent Document 3] Published Unexamined Japanese Patent Publication No. H09-306440

DISCLOSURE OF THE INVENTION

Problem that the Invention is to Solve

According to the above-described Patent Documents 1 to 3, when moisture in the air penetrates or contacts the outer label, the local cell is formed between metal (nickel, etc.) on the surface of the battery case or a terminal and the vapor-deposited metal layer (aluminum, etc.) on the outer label, thereby causing the leaching of electrochemically base metal, and impairing the appearance of the product. The above-described Patent Documents 1 to 3 are intended to prevent the impairment of the product appearance.

However, according to the structure of Patent Document 1, the heat-resistant, electrically insulating layer provided to prevent the formation of local cell and the base material of the outer label made of the heat-shrinkable resin film have different strengths and shrinkage ratios. Therefore, the outer label is likely to become wrinkled or loosened during storage at high temperature. Then, a bent portion of the outer label covering the barrel to the shoulder of the battery may significantly peel and rise (hereinafter, this phenomenon is referred to as a peel-off phenomenon).

According to the structure of Patent Document 2, the formation of local cell is prevented only in the neighborhood of the end faces of the outer label.

Further, according to the structure of Patent Document 3, the design of the battery case and the vapor-deposited metal layer of the outer label is limited, and manufacturing cost increases.

Therefore, as described above, the structures of Patent Documents 1 to 3 are susceptible to improvement. The present invention was developed to solve the above-described problems, and to provide a battery outer label which is less likely to cause the impairment of the appearance due to the leaching of the vapor-deposited metal layer during storage at high temperature and high humidity.

Means of Solving the Problem

To solve the above-described problems, the invention is directed to a battery outer label including a base material made of a heat-shrinkable resin film, a printing layer formed on a front surface of the base material, and a vapor-deposited metal layer and an adhesive layer formed on a back surface of the base material, wherein the battery outer label has a water vapor permeability in the range of 14 to 30 $g/m^2 \cdot 24$ h.

The battery outer label is configured so that an extract obtained by immersing the battery outer label in 10 cc of warm water of 60° C. for 24 hours has a pH in the range of 5.9 to 8.3.

Effect of the Invention

The present invention effectively suppresses formation of local cell caused by the moisture penetrating the outer label and arriving at the surface of the battery case during storage at high temperature and high humidity, and prevents leaching of the vapor-deposited metal layer, so that the appearance of the battery is less likely to be impaired.

Figure 1:
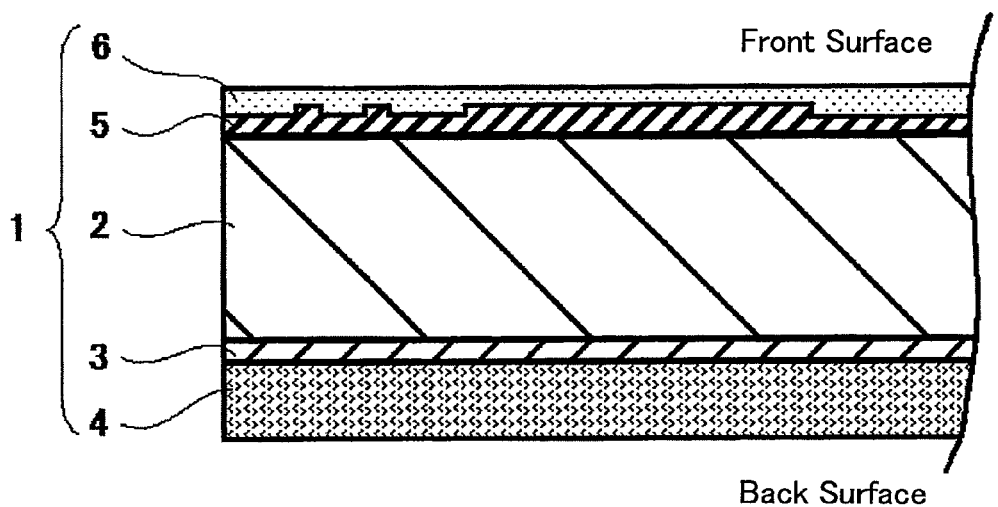
FIG. 1 is a partial cross-sectional view illustrating a battery outer label according to an embodiment of the present invention.

| DESCRIPTION OF CHARACTERS | |
|---|---|
| 1 | Outer label |
| 2 | Base material |
| 3 | Vapor-deposited metal layer |
| 4 | Adhesive layer |
| 5 | Printing layer |
| 6 | Protective layer |
| 11 | Battery case |
| 12 | Positive electrode |
| 13 | Negative electrode |
| 14 | Separator |
| 15 | Gasket |
| 16 | Negative electrode current collector |
| 17 | Negative electrode terminal plate |

BEST MODE FOR CARRYING OUT THE INVENTION

An effective means for increasing the capacity of the battery is to bring an outer diameter of a battery case as close as possible to a standard size. This requires reduction in thickness of the outer label attached to an outer circumferential surface of the battery case. However, if the heat-shrinkable resin film serving as the base material of the outer label (typically about 100 μm in thickness) is thinned down to, for example, about 50 μm, the leaching of the vapor-deposited metal layer, which is caused by the formation of local cell, may become more considerable than before.

Further, if polyvinyl chloride (PVC) mainly used as a material for the heat-shrinkable resin film is replaced with polyethylene terephthalate (PET), which is a promising material for reducing an environmental load, the vapor-deposited metal layer may possibly leach more considerably than before, because PET has a higher water vapor permeability than PVC (typically about 1.5 to 2 times as high as that of PVC).

From the viewpoint of quality control of the battery, it will be more important to make the product information traceable by printing a two-dimensional code (e.g., a bar code, a QR (Quick Response) code, etc.) containing product information about the individual battery (e.g., date of manufacture, manufacturing lot number, manufacturing conditions, pre-shipment inspection data, etc.) on the outer label. However, when the vapor-deposited metal layer leaches due to the formation of the local cell, another problem of difficulty in reading the two-dimensional code may arise, in addition to the conventional problem of poor appearance.

Under the above-described circumstances, and in view of the leaching of the vapor-deposited metal layer due to the formation of local cell that may possibly occur more considerably than before, the inventors of the present invention thought that an important solution to the problem would be giving the outer label itself a function of suppressing the penetration of the moisture, which is a cause of the formation of local cell.

However, thickening the heat-shrinkable resin film serving as the base material of the outer label for the purpose of suppressing the moisture penetration is contradictory to the increase of the battery capacity. Further, increasing the density of the heat-shrinkable resin film may also suppress the moisture penetration, but as long as the heat-shrinkable resin film requires a predetermined shrinkage ratio, it is difficult to establish the manufacturing conditions that simultaneously meet the mutually contradictory requirements, i.e., the increase in density and the improvement in shrinkage ratio.

On the other hand, the moisture penetration can be suppressed by thickening the vapor-deposited metal layer forming the outer label. However, when the vapor-deposited metal layer is made thicker, a larger amount of the vapor-deposited metal layer will leach if the local cell is formed. Therefore, the effect of thickening the vapor-deposited metal layer may be canceled.

With the foregoing in mind, the inventors of the present invention found that the function of suppressing the penetration of a certain amount of moisture can be given to the entire outer label by controlling both the density of the heat-shrinkable resin film and the thickness of the vapor-deposited metal layer, so that the leaching of the vapor-deposited metal layer caused by the formation of local cell can effectively be prevented.

Hereinafter, an embodiment of the present invention will be described with reference to the drawings. However, the present invention is not limited to the following embodiment.

FIG. 1 is a partial cross-sectional view illustrating the structure of a battery outer label 1 according to an embodiment of the present invention. The battery outer label 1 is attached to an outer circumferential surface of a battery case.

As shown in FIG. 1, the battery outer label 1 includes a base material 2 made of a heat-shrinkable resin film, a printing layer 5 and a protective layer 6 formed on a front surface of the base material 2, and a vapor-deposited metal layer 3 and an adhesive layer 4 formed on a back surface of the base material 2. The battery outer label 1 is characterized by having a water vapor permeability in the range of 14 to 30 $g/m^2 \cdot 24$ h.

This structure effectively suppresses the formation of local cell caused by moisture penetrating the outer label 1 and arriving at the surface of the battery case during storage at high temperature and high humidity, and prevents the leaching of the vapor-deposited metal layer 3, so that the appearance of the battery is less likely to be impaired.

When a two-dimensional code (e.g., a bar code, a QR (Quick Response) code, etc.) containing product information of the battery (e.g., date of manufacture, manufacturing lot number, manufacturing conditions, pre-shipment inspection data, etc.) is printed on the printing layer 5, a problem of difficulty in reading the two-dimensional code does not arise because the structure can prevent the leaching of the vapor-deposited metal layer 3 due to the formation of local cell.

When the two-dimensional code is not printed on the printing layer 5, but is provided on the outer circumferential surface of the battery on which the outer label 1 is attached, the same advantage can be obtained.

The water vapor permeability is preferably set within the range of 20 to 27 $g/m^2 \cdot 24$ h. In this range, the outer label can be provided with higher durability and higher reliability.

The "water vapor permeability" mentioned in the present invention indicates the mass of water vapor penetrating a predetermined area of the outer label 1 for a predetermined period of time, and can be measured by a so-called cup method in conformity with JIS Z 0208. The adhesive layer 4, which is included in the outer label 1, is made of a polymer compound which increases viscosity with an increase in temperature. Therefore, the adhesive layer 4 does not substantially affect the water vapor permeability of the outer label 1. Therefore, the water vapor permeability of the outer label 1 may be measured in the absence of the adhesive layer 4 (e.g., after the outer label 1 once attached to the battery case is peeled).

The heat-shrinkable resin film is preferably 50 μm or less in thickness. With the thickness thus defined, the outer label can be more suitable for increasing the capacity of the battery.

A primer treatment or an anchor treatment may suitably be performed on the layers sequentially formed on the base material 2 (the printing layer 5, the protective layer 6, the vapor-deposited metal layer 3, and the adhesive layer 4) so that the layers can be fixed or adhered to each other with more reliability.

The outer label 1 may be configured so that an extract obtained by immersing the outer label 1 in warm water has a pH in the range of 5.9 to 8.3. This range allows for the prevention of the leaching of the vapor-deposited metal layer 3 due to the formation of local cell, and allows for the suppression of acid or alkaline dissolution of the vapor-deposited metal layer 3 due to variations in pH of the moisture penetrated the outer label 1, thereby reliably avoiding defects, i.e., the leaching of the vapor-deposited metal layer 3 and the loss of a metallic sheen.

The extract preferably has a pH in the range of 6.6 to 8.3. In this range, the durability and the reliability further improve, and a peel-off phenomenon is less likely to occur.

The "extract" mentioned in the present invention indicates a liquid obtained by cutting the outer label 1 into the size of 5 cm×5 cm, immersing it into 10 cc of warm water of 60° C. for 24 hours, and removing the outer label 1. The pH of the extract can be measured by a general-purpose pH meter.

When the battery is stored at a higher temperature, the patterns, letters, colors, etc. provided on the outer label 1 may crack, thereby impairing the appearance (hereinafter simply referred to as "print cracking"). A cause of the print cracking is that the hard printing layer 5 cannot follow the shrinking heat-shrinkable resin film as the base material 2, and a number of small microcracks are formed and grown in the printing layer 5.

To deal with this problem, the heat-shrinkable resin film preferably has a shrinkage ratio of 5% or less after being immersed in warm water of 80° C. for 30 seconds. The shrinkage ratio thus defined can effectively prevent the print cracking.

The "shrinkage ratio" mentioned in the present invention indicates a shrinkage ratio in a stretching direction in which the base material 2 is stretched into a film. The shrinkage ratio corresponds to a shrinkage ratio in a circumferential direction of the battery when the outer label 1 is attached to the battery. The shrinkage ratio can be measured by measuring a dimension of a fragment of the outer label of a known dimension after the fragment is immersed in warm water of 80° C. for 30 seconds.

Specifically, the heat-shrinkable resin film is made of a polyethylene terephthalate (PET) resin. Use of this material makes it possible to enhance heat-resistance, and to reduce an environmental load.

EXAMPLES

Hereinafter, the structure and advantages of the present invention will be described by way of examples, but the invention is not limited to the examples.

Example 1

An outer label 1 was fabricated by the following processes 1 to 3.
Process 1: Formation of Base Material 2 and Vapor-Deposited Metal Layer 3

A polyethylene terephthalate resin was molten and shaped into a 80 µm thick film. Using a general uniaxial stretching apparatus, the obtained film was then uniaxially stretched into a 50 µm thick film, while blowing thereon hot air of 250° C. As a heat fixing treatment for obtaining a predetermined density for controlling the water vapor permeability, and a suitable shrinkage ratio, the resulting film was allowed to rotate in contact with a heated roll kept at 96° C. for 20 seconds, thereby obtaining a base material 2 having a density of 1.37 g/cm$^3$. In this heat fixing treatment, the base material 2 can be provided with higher density when the treatment temperature is higher, or with lower shrinkage ratio when the treatment time is longer. Then, a 0.05 µm thick vapor-deposited metal layer 3 made of aluminum was formed on one of the surfaces of the base material 2.

Basically, the process 1 (formation of the base material 2 and the vapor-deposited metal layer 3) controls the water vapor permeability of the finally obtained outer label 1.
Process 2: Formation of Adhesive Layer 4

A tackifier made of a copolymer prepared by mixing butyl acrylate and acrylic acid in the mass ratio of 90:10 was applied to the surface of the vapor-deposited metal layer 3 to a thickness of about 20 µm, thereby forming an adhesive layer 4. To give a high adhesion property to the adhesive layer 4, introduction of acrylic acid having a high polarity carboxyl group is effective. Then, the adhesive layer 4 was covered with a separating sheet (not shown).
Process 3: Formation of Printing Layer 5 and Protective Layer 6

On the other surface on which the vapor-deposited metal layer 3 was not formed, an anchor coat layer made of a polyester resin (less than 2 µm in thickness, not shown) was formed, and then a 2 to 3 µm thick printing layer 5 was formed thereon using a UV ink of FD series manufactured by TOYO INK. Then, a FD-BT-OP varnish manufactured by TOYO INK was applied to the surface of the printing layer 5 to a thickness of 3 µm to provide a protective layer 6.

In the foregoing manner, the outer label 1 shown in FIG. 1 was obtained. The water vapor permeability of the outer label 1 measured after removing the separating sheet (not shown) was 14 g/m$^2$·24 h.

Example 2

The outer label 1 shown in FIG. 1 was obtained in the same manner as Example 1 except that the heat fixing treatment for the base material 2 in the process 1 was performed by allowing the film to rotate in contact with a heated roll kept at 90° C. for 10 seconds to obtain a base material 2 having a density of 1.35 g/cm$^3$, and that a 0.04 µm thick vapor-deposited metal layer 3 made of aluminum was formed on one of the surfaces of the base material 2.

The water vapor permeability of the outer label 1 measured after removing the separating sheet (not shown) was 20 g/m$^2$·24 h.

Example 3

The outer label 1 shown in FIG. 1 was obtained in the same manner as Example 1 except that the heat fixing treatment for the base material 2 in the process 1 was performed by allowing the film to rotate in contact with a heated roll kept at 90° C. for 5 seconds to obtain a base material 2 having a density of 1.31 g/cm$^3$.

The water vapor permeability of the outer label 1 measured after removing the separating sheet (not shown) was 25 g/m$^2$·24 h.

Example 4

The outer label 1 shown in FIG. 1 was obtained in the same manner as Example 1 except that the heat fixing treatment for the base material 2 in the process 1 was performed by allowing the film to rotate in contact with a heated roll kept at 80° C. for 10 seconds to obtain a base material 2 having a density of 1.31 g/cm³, and that a 0.04 μm thick vapor-deposited metal layer 3 made of aluminum was formed on one of the surfaces of the base material 2.

The water vapor permeability of the outer label 1 measured after removing the separating sheet (not shown) was 27 g/m²·24 h.

Example 5

The outer label 1 shown in FIG. 1 was obtained in the same manner as Example 1 except that the heat fixing treatment for the base material 2 in the process 1 was performed by allowing the film to rotate in contact with a heated roll kept at 80° C. for 10 seconds to obtain a base material 2 having a density of 1.31 g/cm³, and that a 0.03 μm thick vapor-deposited metal layer 3 made of aluminum was formed on one of the surfaces of the base material 2.

The water vapor permeability of the outer label 1 measured after removing the separating sheet (not shown) was 30 g/m²·24 h.

Comparative Example 1

The outer label 1 shown in FIG. 1 was obtained in the same manner as Example 1 except that the heat fixing treatment for the base material 2 in the process 1 was performed by allowing the film to rotate in contact with a heated roll kept at 70° C. for 10 seconds to obtain a base material 2 having a density of 1.27 g/cm³, and that a 0.04 μm thick vapor-deposited metal layer 3 made of aluminum was formed on one of the surfaces of the base material 2.

The water vapor permeability of the outer label 1 measured after removing the separating sheet (not shown) was 35 g/m²·24 h.

Comparative Example 2

The outer label 1 shown in FIG. 1 was obtained in the same manner as Example 1 except that the heat fixing treatment for the base material 2 in the process 1 was performed by allowing the film to rotate in contact with a heated roll kept at 70° C. for 5 seconds to obtain a base material 2 having a density of 1.23 g/cm³, and that a 0.03 μm thick vapor-deposited metal layer 3 made of aluminum was formed on one of the surfaces of the base material 2.

The water vapor permeability of the outer label 1 measured after removing the separating sheet (not shown) was 55 g/m²·24 h.

Figure 2:
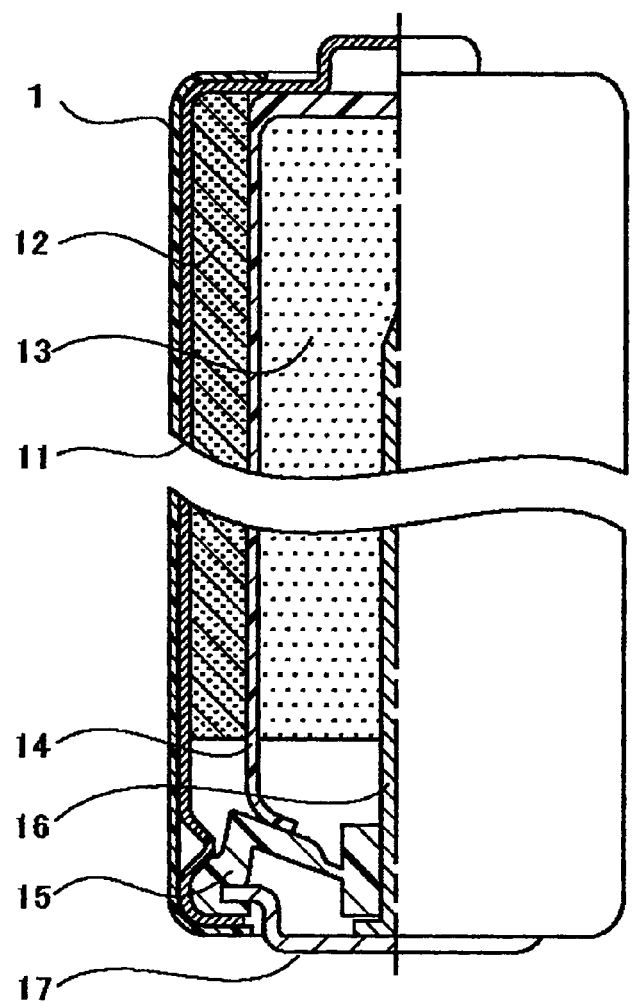
FIG. 2 is a view illustrating the structure of an alkaline battery according to an embodiment of the present invention.

Next, the outer label 1 of the present invention attached to the battery will be described with reference to FIG. 2. FIG. 2 shows the structure of an alkaline battery according to an embodiment of the present invention.

In a closed-end, cylindrical battery case 11 which is made of a nickel-plated steel plate and serves as both a positive electrode terminal and a positive electrode current collector, a hollow cylindrical positive electrode 12 was placed to be in contact with the battery case 11. A negative electrode 13 was placed in a hollow portion of the positive electrode 12 with a closed-end, cylindrical separator 14 interposed therebetween. After the battery components, such as the positive electrode 12, the negative electrode 13, etc., were placed in the battery case 11, an opening of the battery case 11 was sealed with a negative electrode terminal plate 17, which is electrically connected to a nail-shaped negative electrode current collector 16, and a gasket 15 integrated with each other. Then, each of the above-described outer labels 1 of Examples 1 to 5 of the present invention and Comparative Examples 1 to 2 was wrapped around the outer circumferential surface of the battery case, and was heat-shrunk onto the battery by applying hot air thereto.

The obtained alkaline batteries, 10 pieces each, were stored in an environmental test chamber in which temperature was controlled to 60±2° C., and humidity was controlled to 90±5%. After 2 weeks and 4 weeks, the batteries were taken out of the chamber, and were visually checked as to whether the vapor-deposited metal layer 3 leached or not in the high-temperature and high-humidity environment. Table 1 shows the rate of occurrence of the leaching.

Batteries in which the rate of occurrence of the leaching was 0% after the elapse of 4 weeks were regarded as good batteries which are less likely to impair the appearance.

For obtaining higher durability and higher reliability against more severe environment, the batteries were left in the same environment for 6 weeks and evaluated in the same manner. The results are also shown in Table 1.

TABLE 1

| | Base material | | | Vapor-deposited metal layer Thickness | Outer label Water vapor permeability | Alkaline battery Rate of occurrence of leaching of vapor-deposited metal layer in 60° C./90% environment | | |
|---|---|---|---|---|---|---|---|---|
| | Heat fixing treatment for stretching the film | | Density | | | | | |
| | Temp. | Time | g/cm³ | μm | g/m²·24 h | 2 weeks | 4 weeks | 6 weeks |
| Ex. 1 | 96° C. | 20 sec | 1.37 | 0.05 | 14 | 0% | 0% | 0% |
| Ex. 2 | 90° C. | 10 sec | 1.35 | 0.04 | 20 | 0% | 0% | 0% |
| Ex. 3 | 90° C. | 5 sec | 1.31 | 0.05 | 25 | 0% | 0% | 0% |
| Ex. 4 | 80° C. | 10 sec | 1.31 | 0.04 | 27 | 0% | 0% | 0% |
| Ex. 5 | 80° C. | 10 sec | 1.31 | 0.03 | 30 | 0% | 0% | 40% |
| Com. Ex. 1 | 70° C. | 10 sec | 1.27 | 0.04 | 35 | 0% | 20% | 80% |
| Com. Ex. 2 | 70° C. | 5 sec | 1.23 | 0.03 | 55 | 50% | 80% | 100% |

In the alkaline batteries of Comparative Example 2 using the outer label 1 having a water vapor permeability of 55 g/m²·24 h, the vapor-deposited metal layer 3 leached after the 2-week storage in the environment at a temperature of 60° C. and a humidity of 90%. The rate of occurrence of the leaching increased with the increase in storage time. In the batteries of Comparative Example 1 using the outer label 1 having a water vapor permeability of 35 g/m²·24 h, the vapor-deposited metal layer leached after the 4-week storage in the same environment.

In the alkaline batteries of Examples 1 to 5 of the present invention using the outer label 1 having a water vapor permeability in the range of 14 to 30 g/m²·24 h, the vapor-deposited metal layer 3 did not leach even after the 4-week storage in the same environment.

When the water vapor permeability was in the range of 27 g/m²·24 h or lower, the vapor-deposited metal layer 3 did not leach even after the 6-week storage. This indicates that the battery had high durability and high reliability.

To obtain the base material 2 having low water vapor permeability, raising the density of the base material 2 is preferable. However, since the heat fixing treatment for stretching the base material 2 requires high treatment temperature and long treatment time, running costs and the number of processes increase. Further, the thicker vapor-deposited metal layer 3 can give the lower water vapor permeability, but it involves the increase in the number of processes. In view of economy, high durability, and high reliability, the water vapor permeability of the outer label 1 is preferably in the range of 20 to 27 $g/m^2 \cdot 24$ h.

Next, a study on a pH of an extract of the outer label 1 will be described. This study starts from the inventor's finding that a battery stored at high temperature and high humidity causes the leaching of aluminum, though it is not considerable, when the battery is made of an aluminum battery case, which is generally used for lithium ion batteries, and an outer label including a vapor-deposited metal layer made of aluminum.

For analysis of the leaching of the vapor-deposited metal layer that occurs even when the vapor-deposited metal layer and the battery case are equipotential, the outer labels of the following examples and comparative examples were prepared and attached to the batteries for the same evaluation.

Example 6

The outer label 1 shown in FIG. 1 was obtained in the same manner as Example 5 except that a tackifier made of a copolymer of butyl acrylate and acrylic acid mixed in the mass ratio of 92:8 was applied to a thickness of about 20 μm as the adhesive layer 4 formed in the process 2.

After the separating sheet (not shown) was removed, the outer label 1 was cut into a size of 5 cm×5 cm, and immersed into 10 cc of warm water of 60° C. for 24 hours. After removing the outer label 1, the resulting extract had a pH of 6.6. An extract of the outer label 1 of Example 5 had a pH of 5.9.

Example 7

The outer label 1 shown in FIG. 1 was obtained in the same manner as Example 5 except that a tackifier made of a copolymer of butyl acrylate and acrylic acid mixed in the mass ratio of 95:5 was applied to a thickness of about 20 μm as the adhesive layer 4 formed in the process 2. An extract of this outer label 1 had a pH of 7.2.

Example 8

The outer label 1 shown in FIG. 1 was obtained in the same manner as Example 5 except that a tackifier made of a copolymer of butyl acrylate and acrylic acid mixed in the mass ratio of 97:3 was applied to a thickness of about 20 μm as the adhesive layer 4 formed in the process 2. An extract of this outer label 1 had a pH of 8.3.

Comparative Example 3

The outer label 1 shown in FIG. 1 was obtained in the same manner as Comparative Example 2 except that a tackifier made of a copolymer of butyl acrylate and acrylic acid mixed in the mass ratio of 95:5 was applied to a thickness of about 20 μm as the adhesive layer 4 formed in the process 2. An extract of this outer label 1 had a pH of 7.2. An extract of the outer label 1 of Comparative Example 2 had a pH of 5.9.

These outer labels 1 were attached to alkaline batteries, respectively, and evaluated after storage in the same high-temperature and high-humidity environment as described above. Table 2 shows the results.

TABLE 2

| | Outer label | | Alkaline battery The rate of occurrence of leaching of vapor-deposited metal layer in 60° C./90% environment | | |
|---|---|---|---|---|---|
| Adhesive layer Mass ratio of butyl acrylate:acrylic acid | Water vapor permeability $g/m^2 \cdot 24$ h | pH of extract | 2 weeks | 4 weeks | 6 weeks |
| Ex. 5  90:10 | 30 | 5.9 | 0% | 0% | 40% |
| Ex. 6  92:8 | | 6.6 | 0% | 0% | 0% |
| Ex. 7  95:5 | | 7.2 | 0% | 0% | 0% |
| Ex. 8  97:3 | | 8.3 | 0% | 0% | 0% |
| Com. Ex. 2  90:10 | 55 | 5.9 | 50% | 80% | 100% |
| Com. Ex. 3  95:5 | | 7.2 | 0% | 20% | 50% |

Improvement in durability and reliability was observed in Examples 6 to 8, in which the pH of the extract of the outer label 1 was gradually shifted to weak alkali from the pH of 5.9 of the extract of the outer label 1 of Example 5. The same improvement was observed in Comparative Examples 2 and 3 having high water vapor permeability.

The results indicate that the leaching of the vapor-deposited metal layer 3 depends on variations in pH of the moisture penetrating the outer label 1, and is caused by acid or alkaline dissolution of the vapor-deposited metal. This is ascribable to unreacted monomer (remaining acrylic acid) of the butyl acrylate-acrylic acid copolymer used as the tackifier.

Thus, the extract of the outer label 1 preferably has a pH around neutral, i.e., in the range of 5.9 to 8.3. The pH of the extract in the range of 6.6 to 8.3 will improve the durability and the reliability to a further extent.

If the pH of the extract of the outer label 1 exceeds 8.3, the polarity of the adhesive layer 4 deteriorates, thereby reducing the adhesion property. This may easily cause defects, such as peel-off.

Then, a study on the print cracking that occurs when the battery is stored at higher temperature will be described. The study has been made on various outer labels having the same water vapor permeability (27 $g/m^2 \cdot 24$ h) as the outer label 1 of Example 4.

Example 9

The outer label 1 shown in FIG. 1 was obtained in the same manner as Example 4 except that the heat fixing treatment for the base material 2 in the process 1 was performed by allowing the film to rotate in contact with a heated roll kept at 90° C. for 10 seconds to obtain a base material 2 having a density of 1.35 $g/cm^3$, and that a 0.02 μm thick vapor-deposited metal layer 3 made of aluminum was formed on one of the surfaces of the base material 2. The outer label 1 had a shrinkage ratio of 3.2%.

Example 10

The outer label 1 shown in FIG. 1 was obtained in the same manner as Example 4 except that the heat fixing treatment for the base material 2 in the process 1 was performed by allowing the film to rotate in contact with a heated roll kept at 85° C. for 10 seconds to obtain a base material 2 having a density of 1.33 $g/cm^3$, and that a 0.03 μm thick vapor-deposited metal layer 3 made of aluminum was formed on one of the surfaces of the base material 2. The outer label 1 had a shrinkage ratio of 5.0%.

The outer label 1 of Example 4 had a shrinkage ratio of 7.5%.

Each of the outer labels 1 was attached to an alkaline battery, and stored in an environmental test chamber at 80±2° C. for 4 weeks. Then, they were visually checked as to whether the print cracking occurred or not. Table 3 shows the rate of occurrence of the print cracking. The results of the batteries stored in the same high-temperature and high-humidity environment are also shown in Table 3.

TABLE 3

| Outer label | | Alkaline battery | | | |
| --- | --- | --- | --- | --- | --- |
| Water vapor permeability | Shrinkage ratio | The rate of occurrence of leaching of vapor-deposited metal layer in 60° C./90% environment | | | The rate of occurrence of print cracking in 80° C. environment |
| g/m² · 24 h | % | 2 weeks | 4 weeks | 6 weeks | 4 weeks |
| Ex. 9 | 27 | 3.2 | 0% | 0% | 0% | 0% |
| Ex. 10 | | 5.0 | 0% | 0% | 0% | 0% |
| Ex. 4 | | 7.5 | 0% | 0% | 0% | 20% |

The outer labels 1 of Examples 9 and 10 did not cause the print cracking. Specifically, with the shrinkage ratio of the outer label 1 kept to 5.0% or less, the hard printing layer 5 was able to follow the base material 2 shrinking during storage at high temperature. This clarifies that the shrinkage ratio thus controlled can effectively suppress the print cracking.

In the above-described examples, polyethylene terephthalate is used as the base material 2. However, the present invention is also applicable even when other heat-shrinkable resin films made of polyvinyl chloride, polyethylene, polystyrene, polypropylene, and a copolymer of them are used.

In the above-described examples, the protective layer 6 is made of a varnish coating. However, the present invention is also applicable even when the same heat-shrinkable resin film as the base material 2 is laminated on the printing layer. In this case, the base material 2 and the protective layer 6 are not necessarily made of the same material.

INDUSTRIAL APPLICABILITY

The battery outer label of the present invention is useful for high-durability and high-quality batteries which are less likely to impair the appearance due to the leaching of a vapor-deposited metal layer during storage at high temperature and high humidity.

The invention claimed is:

1. A battery outer label attached to an outer circumferential surface of a battery case, the battery outer label comprising:
    a base material made of a heat-shrinkable resin film;
    a printing layer formed on a front surface of the base material; and
    a vapor-deposited metal layer and an adhesive layer formed on a back surface of the base material, wherein
    the entire battery outer label including the base material, the printing layer, the vapor-deposited metal layer, and the adhesive layer has a water vapor permeability in the range of 14 to 30 g/m²·24 h,
    the heat-shrinkable resin film is 50 μm or less in thickness, and
    the vapor-deposited metal layer is 0.03-0.05 μm in thickness.

2. The battery outer label of claim 1, wherein the water vapor permeability is in the range of 20 to 27 g/m²·24 h.

3. The battery outer label of claim 1, wherein an extract obtained by immersing the battery outer label in 10 cc of warm water of 60° C. for 24 hours has a pH in the range of 5.9 to 8.3.

4. The battery outer label of claim 3, wherein the pH of the extract is in the range of 6.6 to 8.3.

5. The battery outer label of claim 1, wherein a two-dimensional code containing product information of a battery to which the battery outer label is attached is printed on the printing layer.

6. The battery outer label of claim 5, wherein the two-dimensional code is provided on an outer circumferential surface of the battery case to which the battery outer label is attached, instead of being printed on the printing layer.

7. The battery outer label of claim 5 or 6, wherein the two-dimensional code is a bar code or a QR (Quick Response) code.

8. The battery outer label of claim 1, wherein the heat-shrinkable film has a shrinkage ratio of 5% or less after being immersed in warm water of 80° C. for 30 seconds.

9. The battery outer label of claim 1 or 8, wherein the heat-shrinkable resin film is made of a polyethylene terephthalate resin.

10. A battery provided with the battery outer label of any one of claims 1-6 and claim 8.

* * * * *